United States Patent [19]

Anderson

[11] Patent Number: 4,945,338
[45] Date of Patent: Jul. 31, 1990

[54] ALTERNATOR POWERED MOTOR WARNING SYSTEM

[75] Inventor: Philip A. Anderson, Waukegan, Ill.

[73] Assignee: Outboard Marine Corporation, Waukegan, Ill.

[21] Appl. No.: 299,145

[22] Filed: Jan. 23, 1989

[51] Int. Cl.[5] .............................................. B60Q 11/00
[52] U.S. Cl. .................................... 340/459; 340/449; 340/450.3
[58] Field of Search ............ 340/459, 438, 449, 450.3, 340/522, 611; 123/198 D

[56] References Cited

U.S. PATENT DOCUMENTS

| | | | |
|---|---|---|---|
| 3,307,167 | 2/1967 | Race | 340/449 X |
| 4,015,237 | 3/1977 | Takatani et al. | 340/459 |
| 4,019,489 | 4/1977 | Cartmill | 340/611 X |
| 4,413,248 | 11/1983 | Staerzl | 340/459 |
| 4,489,305 | 12/1984 | Lang et al. | 340/459 |
| 4,684,917 | 8/1987 | Tharmar | 340/450.3 |
| 4,695,822 | 9/1987 | Furukawa | 340/522 X |

*Primary Examiner*—Joseph A. Orsino
*Assistant Examiner*—Brian R. Tumm
*Attorney, Agent, or Firm*—Welsh & Katz, Ltd.

[57] ABSTRACT

A warning system for an internal combustion engine, such as a small displacement outboard marine engine or the like, which does not have a switched B+ supply line. A parallel rectifier is taken from the alternator of the starting circuit of an engine to provide an auxiliary power source to the warning system when the engine is operating. Another auxiliary power source is taken from the positive coil contact of the starter solenoid to provide power to the warning system when the engine is starting. The auxiliary power sources are connected to one terminal of an annunciator whose other terminal is connected to a common node. A plurality of parallel sensors including an over-temperature switch, a low oil switch, and a variable ratio oiler are connected between the common node and ground to sound the annunciator based on abnormal operating conditions of the engine. Alternative embodiments show an auxiliary power source for a single phase alternator and a multiple phase alternator, respectively.

20 Claims, 2 Drawing Sheets

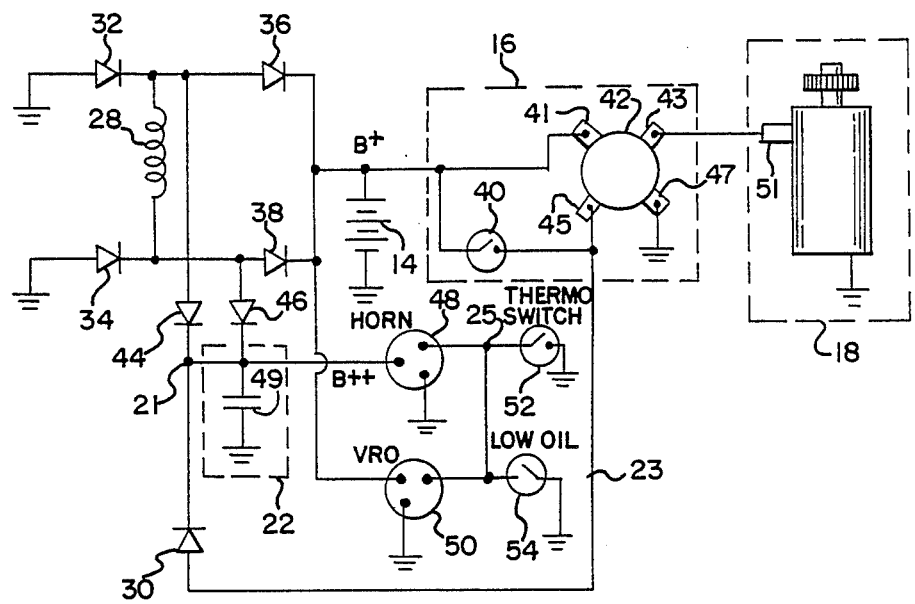
FIG-3-
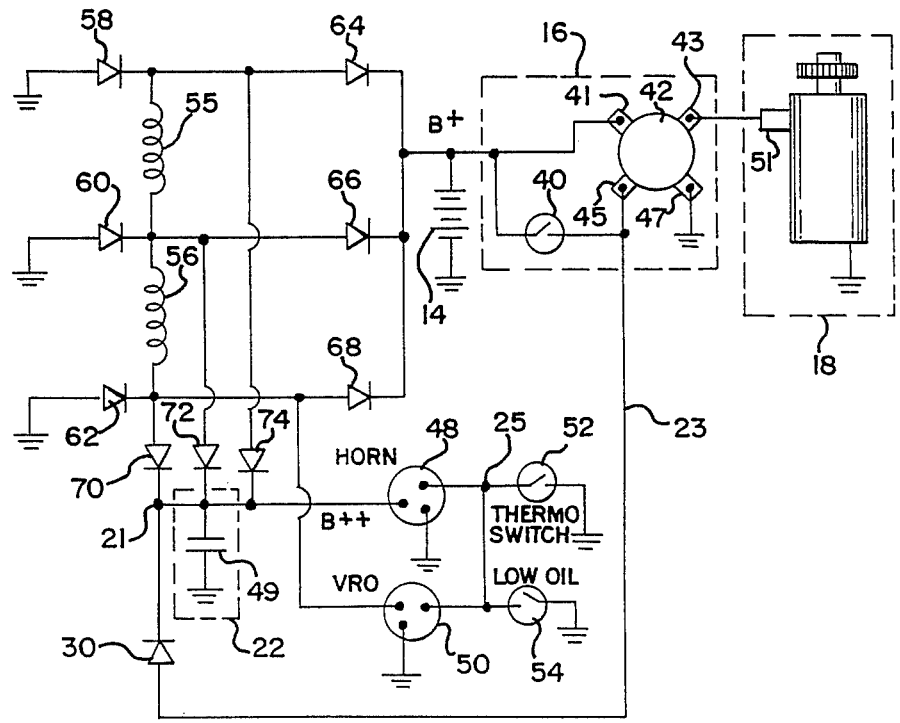
FIG-4-

4,945,338

ALTERNATOR POWERED MOTOR WARNING SYSTEM

FIELD OF THE INVENTION

The invention pertains generally to systems for the warning of abnormal operating conditions of an internal combustion engine, such as an outboard marine engine, and is more particularly directed to such warning systems used in small displacement outboard marine engines which do not have a switched B+ power line.

BACKGROUND OF THE INVENTION

Internal combustion engines are designed to operate within certain normal operating conditions of temperature and oil pressure. These normal conditions for internal combustion engines require the circulation of oil under pressure to lubricate their working parts and, if such oil pressure is lost, this condition indicates the lack of circulation of oil. Marine engines typically either have circulating air or circulating water to cool them and any failure of the coolant circulation rapidly causes an increase in the temperature of the engine. In addition, outboard marine engines of the two-cycle variety normally mix oil and gasoline for their fuel. A lack of sufficient oil in the fuel mixture for a two-cycle engine can additionally cause an abnormal condition to occur.

Any of these conditions which are not in the normal operating range of the engine can cause extensive damage if not communicated quickly to the operator of the engine. However, the operator, if reasonably alerted to such abnormal condition, can take action to determine their cause and correct them to prevent such damage. There are many types of engine monitoring or warning systems for internal combustion engines which attempt to solve these problems by providing visual or audible annunciations of abnormal conditions. In addition, there are engine monitoring systems which are used particularly for outboard marine engines.

One such monitoring system is illustrated in U.S. patent application Ser. No. 201,085, now allowed, entitled "Single Wire Engine Indicator Device" by R.J. Bragenzer et al., which is commonly assigned with the present application. The disclosure of Bragenzer is hereby expressly incorporated by reference herein.

Another such monitoring system is described in U.S. Pat. No. 4,019,489 entitled "Safety Apparatus for Engines" by Cartmill. Cartmill discloses a circuit that is responsive to water pressure, oil pressure, and engine temperature. Each of these variables is detected by a conventional sensor that is connected by its own insulated wire to an electronic circuit at a remote location.

These and other prior monitoring systems, although being serviceable for their environment, use an external power supply line which is generally termed switched B+. The switched B+ power supply line for an outboard engine is the battery voltage connected to a separate line which is switched through the starting key switch and then used for accessories, including any engine monitoring or warning system. The engine is started with the key in the "start" position for cranking and then the key is turned to the "run" position to power the accessories while the engine is operating. However, there are many outboard marine engines which do not have a switched B+ power supply line and, therefore, cannot take advantage of such warning systems. It would be extremely advantageous to provide an engine warning system for these outboard engines, and other internal combustion engines, which do not include a switched B+ power supply line.

But, while engine warning systems would be advantageous on these engines, the need for keeping such systems elegant and simple is paramount. Generally, engines without a switched B+ power line are small displacement engines, such as small outboard marine engines, which are designed for less complexity and few, if any, accessories. To be a viable addition to such engines, the engine warning system cannot overcomplicate the design or require exotic components. Further, such warning systems need to be compact to match the existing small profiles and cowlings of such engines and rugged to survive in the environment such engines are used in.

SUMMARY OF THE INVENTION

Therefore, it is an object of the invention to provide an internal combustion engine warning system for those engines which do not have a switched B+ power line, for example, small displacement outboard marine engines or like.

Another object of the invention is to provide an improved internal combustion engine warning system for small displacement engines which is simple, inexpensive and rugged.

Still another object of the invention is to provide an improved internal combustion engine warning system which is powered during engine operation without an off/on switch.

Yet another object of the invention is to provide an improved internal combustion engine warning system which is powered during engine starting and operation without an off/on switch.

In accordance with the foregoing objects, the invention provides an engine warning system for those internal combustion engines, such as small displacement outboard marine engines or the like, which do not have a switched B+ supply line, but have other power sources such as an alternator and a battery.

In a first preferred embodiment, the engine warning system includes means for obtaining power from an alternator when the engine is operating which supplies the power to an annunciation means. The motor warning system further includes means for obtaining power from the battery when the engine is starting which supplies the power to the annunciation means. The power obtaining means are connected in such a manner that they do not interfere with the conventional operation of the alternator and battery and only draw power from them during engine operation and starting respectively. Thus, power is supplied to the annunciation means when it is desired to have the warning system operational, i.e., during the starting and operation of the engine, without the necessity of a separate switch to turn any power off and on. Power sources which are already present in small engine systems are used, thereby reducing the complexity of the engine warning system.

The annunciation means preferably is a piezoelectric horn which gives an audible tone when energized. The piezoelectric horn is advantageous in its simplicity and power requirements while generating a readily recognizable audible warning of an abnormal operating condition. The power supplied by the power obtaining means is pulsating DC from the alternator and pure DC from the battery, and the piezoelectric horn advantageously can be used with both. This simplifies the warning circuitry because no special power supplies or DC to AC conversion is necessary to power the annunciation means. The piezoelectric horn is a two terminal device which operates over a range of voltages to efficiently turn electrical energy into sound.

In a first illustrated implementation, the means for obtaining alternator power from a single phase, full-wave rectified alternator includes auxiliary rectification means comprising a pair of diodes connected across the inputs to the full-wave rectifier and poled for conduction in parallel with one side of the bridge. The other terminals of the diodes feed a power supply node. In this manner, the auxiliary rectification means do not interfere with the standard operation of the full-wave rectifier, but supply power to the power node only when the engine is operating. When the engine is not operating, the alternator does not generate power and the battery power is blocked from reaching the power supply node by the diodes of the full-wave rectifier.

In a second illustrated implementation, the means for obtaining alternator power from a dual phase, full-wave rectified alternator includes auxiliary rectification means comprising three diodes, wherein pairs of the diodes are connected across the inputs to each phase of the full-wave rectifier and poled for conduction in parallel with one side of each phase. The other terminals of the diodes feed the power supply node.

The means for obtaining battery power during starting includes an auxiliary power line from the battery side of the coil of the starter solenoid to the power supply node. This point of the starter circuit is connected to B+ only during the starting phase of the engine and thus provides power to the annunciation means for this time period and no other. A blocking diode is provided in the auxiliary power line and poled to prevent power from the alternator from reaching the starter solenoid or battery.

The piezoelectric horn is connected between the power supply node and a common node to which a plurality of abnormal condition sensors are attached. Preferably, the sensors include switches which close upon the sensing of an abnormal engine condition and connect the common node to ground. The connection thereby forms an analog OR gate where any one of the sensors can sound the annunciation means, if the engine is either starting or in operation. When the engine is stopped the annunciation means is disconnected from its power supply and thus silenced. Thus, the operation of the circuit provides an audible warning during starting and operation of the engine without any operator-controlled switches.

BRIEF DESCRIPTION OF THE DRAWINGS

These and other aspects, features, and objects of the invention will become apparent and more fully described upon reading the following detailed description when taken in conjunction with the attached drawings wherein:

FIG. 3 is a detailed electrical schematic diagram of the starting circuit and a first embodiment of the engine warning system illustrated in FIG. 2; and FIG. 4 is a detailed electrical schematic diagram of the starting circuit and a second embodiment of the engine warning system illustrated in FIG. 2.

DETAILED DESCRIPTION OF THE PREFERRED EMBODIMENTS

Figure 1:
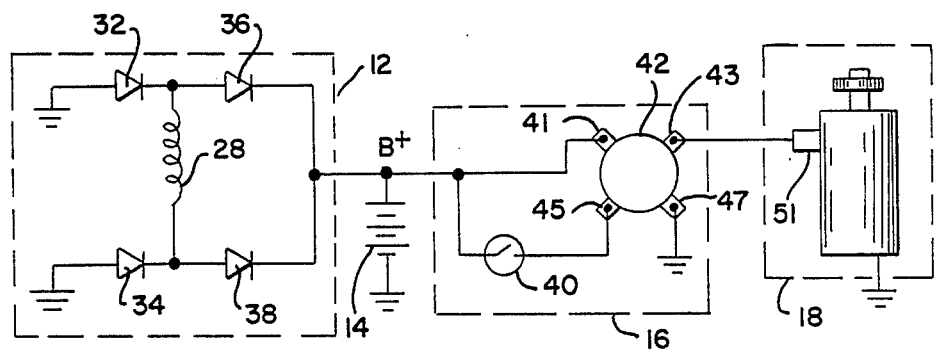
FIG. 1 is a detailed electrical schematic diagram of a prior art starting circuit for a small displacement outboard marine engine without a switched B+ line.

FIG. 1 illustrates a conventional electric starting circuit for an internal combustion engine, such as a small displacement outboard marine engine or the like, without a switched B+ line. Such circuits are found on smaller marine engines where there are no accessories to power and a basic system is utilized for simplicity, ease of maintenance, and cost effectiveness.

The starting circuit includes an alternator based power supply 12, a battery 14, a starter solenoid circuit 16, and a starter motor 18. The starter solenoid circuit 16 includes a starter switch 40, which can be a simple push button with a spring return, and a starter solenoid 42 having switch contacts 41, 43 and coil contacts 45, 47. One of the switch contacts 41 is connected to the positive terminal of a battery 14 and the other switch contact 43 is connected to the positive terminal of the starter motor 18. The coil contact 47 is connected to ground while the coil contact 45 is connected to the positive terminal of the battery 14 through the starter switch 40.

When the starter switch 40 is closed, the B+ voltage is applied to terminal 45 which causes current to flow through the coil of the starter solenoid 42 to ground via contact 47, thereby closing normally open switch contacts 41, 43. The closing of the switch contacts applies the B+ voltage to the positive terminal of motor 18 causing the engine to turn over and eventually start. Once the engine is started, the switch 40 is released or opened and the starter solenoid 42 breaks the contacts 41, 43 to disengage the starter motor 18.

The conventional alternator based power supply 12 charges the battery 14 only while the engine is running. The power supply 12 comprises, in the illustration, a stator winding 28 which has a voltage induced in it by the passage of a magnet (not shown) on the flywheel of the engine. Thus, the stator winding 28 will only supply power when the engine is rotating and there is relative movement between the magnet and winding. A full-wave rectifier comprising diodes 32, 34, 36 and 38, produces pulsating DC pulses to the battery 14 when the engine is running to assist it in maintaining a charge. This type of alternator provides a convenient, low cost and compact means for charging the battery of a small internal combustion engine. Normally, the power supply 12 is designed to deliver a nominal voltage of approximately 13–15V, which is about 1–3V higher than the 12V rating of the battery 14, at a specified operating speed.

Figure 2:
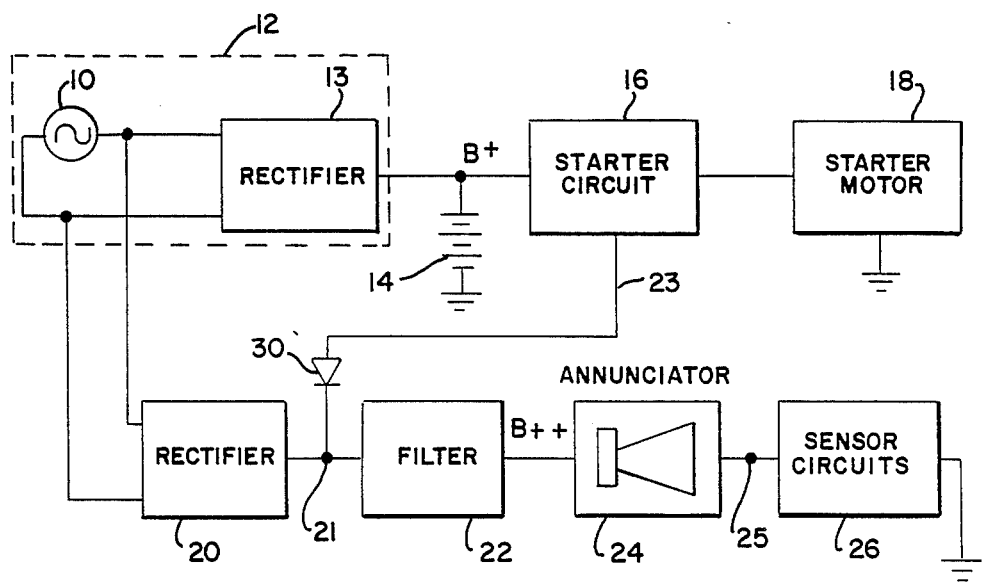
FIG. 2 is functional block diagram of the starting circuit illustrated in FIG. 1 combined with a engine warning system constructed in accordance with the invention.

In FIG. 2 the invention is shown in block diagram form connected to the starter circuit of FIG. 1. The invention includes a means for obtaining power from the alternator 10. Preferably, the means for obtaining power includes a rectifier means 20 connected to the alternator 10. The rectifier means 20 is connected in parallel with rectifier means 13 of the starter circuit to produce a pulsating DC voltage from the alternator 10 at an auxiliary power supply node 21. The power at node 21, thereafter may be filtered by filter 22 to deliver a pseudo B+ voltage, B++, to an annunciator 24. The annunciator 24, which can be embodied as a number of visual or audible type warning devices, is a two terminal device connected between the power supply node 21 and a common node 25 and then to ground by one or more sensor circuits 26.

Because the alternator 10 does not generate power efficiently when the engine is cranking and it is desirable to have the motor warning system operable during this time, power obtaining means from the battery including power supply line 23 and diode 30 are provided for powering the warning system when the starter circuit 16 is operating.

In this manner the annunciator 24 has power applied to it when the engine is starting and when the engine is running, but not when the engine is off. No additional switches are necessary for the annunciation system to operate and the circuit is simple because it uses many elements of an existing system to perform its functions.

FIG. 3 illustrates a detailed electrical schematic of a first preferred embodiment of the engine warning system illustrated in FIG. 2. This embodiment is for a single phase full-wave rectified alternator having a single stator winding 28 and which produces a single phase of AC voltage across its terminals. The first terminal of the stator winding 28 is connected to a first leg of the full-wave rectifier comprising diodes 32 and 36 of the supply circuit 12. The second leg of the full-wave rectifier of the supply circuit 12 is comprised of the diodes 34 and 38 and is connected to a second terminal of winding 28. Auxiliary rectifier diodes 44 and 46 are connected in parallel with bridge diodes 36, 38, respectively to the first and second terminals of the stator winding 28 and poled in the direction to source current to the filter means 22, shown as a capacitor 49.

The annunciator 24, in the embodiment illustrated as a two-terminal piezoelectric horn 48, is connected to the positive terminal of the filter capacitor 49 and to a common node 25 while the metal case of the horn is connected to ground. The common node can be grounded to complete a circuit through the annunciation 24 thereby causing an alert tone. In this manner, power is supplied to one terminal (node 21) of the annunciator 24 during starting and operating and the other terminal is connected to a common node 25 which can be grounded if an abnormal condition exists to sound an alarm. The circuit requires no special switching or operator intervention to operate and automatically is disconnected when the engine is turned off. Thus, a circuit for an engine warning system is shown which is enabled during a plurality of operations (starting, running), is disabled during an engine operation (off), and is capable (grounding common node 25) of sounding an alarm if any of a plurality of abnormal engine conditions exists.

A plurality of sensors, which contain switches, including a variable ratio oiler (VRO) 50, a thermo-switch 52, and a low oil warning switch 54, are connected between the common node 25 and a reference voltage, i.e., ground. The thermo-switch 52 is a bimetallic switch, usually located in the head of the engine, which closes when the engine head temperature exceeds a particular operating point. When the switch 52 closes, node 25 is grounded which causes the auxiliary power supplied to node 21 to operate horn 48. In a similar manner, the low oil switch 54 is a level sensing switch in the oil circulation circuit of the engine which closes if the oil level falls below a certain point. When the oil level falls, the switch connects node 25 to ground, thereby sounding the horn 48. Additionally, the VRO 50, when the oil to gasoline ratio in the fuel mixture falls below a particular point, will close a switch and ground point 25. In each instance, the grounding of point 25 will cause the horn 48 to sound as common node 51 acts as an analog OR gate for the three abnormal conditions.

During the starting of the motor, the start switch 40 will be closed and will conduct battery voltage B+ from line 23 to the node 21, filter capacitor 49, and thereby to the positive terminal of the horn 48. Because diode 30, is back biased, the alternator winding 28 is protected from battery voltage during starting. Thereafter, when the engine starts and the alternator 10 comes up to speed, the supply of power to node 21, which is the positive terminal of the horn 48, is through the auxiliary rectifier diodes 44, 46 and filter capacitor 49. Because diode 30 is back biased, the starter solenoid 42 is protected from the alternator voltage. The piezoelectric horn 48 is advantageous in this use because it is a two-terminal device which allows simplification of the circuitry as shown in FIG. 1. Further, the piezoelectric horn 48 will produce sufficient sound energy from either the 12V of the battery or the pulsating DC of the alternator 10 because it efficiently transforms electrical energy into sound. The piezoelectric horn 48 is substantially sealed, weather proof and rugged because it has no moving parts and is not readily susceptible to physical shocks. The device 48 is small enough to fit into the cowling of many small displacement engines and its mounting creates no repackaging problems. Preferably, for small displacement outboard marine engines, the mounting of the piezoelectric horn 48 can be in the handle of the engine which is conventionally used to pivot the engine in its mounting to steer the boat. This configuration places the audible warning device (horn 48) in close proximity to the operator of the boat so that it is readily heard.

FIG. 4 is an alternative embodiment of the engine monitor apparatus illustrated in FIG. 2. The embodiment in FIG. 4 differs from the embodiment in FIG. 3 by having a two phase alternator 10 instead of a single phase alternator. Oppositely phased stator windings 54 and 55 are series connected between full-wave rectifier diodes 58, 60, 62, 64, 66 and 68, respectively to form two phases. The rectifier diodes form DC pulses from the different phases and polarities of the alternator 10 for charging the battery 14. Each phase of the alternator has a pair of three auxiliary diodes 70, 72 and 74 connected between it and the power supply node 21 for generating the auxiliary voltage B++. The cathodes of diodes 70, 72 and 74 are paralleled at the node 21 and positive terminal of filter capacitor 49. The diode 30 is connected at its cathode to the filter capacitor 49 and at its anode to the coil contact 45 of the coil of the starter solenoid 42.

The operation of FIG. 4 is similar to that of FIG. 3 in that, during starting, battery power B+ is supplied through the starting switch 40 and diode 30 to the filter capacitor 49 and the engine warning circuitry. After starting, the three diodes 70, 72 and 74 supply pulsating DC of different phases to the filter capacitor 49 to power the motor warning circuitry. The warning circuitry, including horn 48, VRO 50, thermo-switch 52 and low oil switch 54, operates identically to that described for FIG. 3. The diodes of the power obtaining means are substantially matched with those of the full-wave rectifier phase which they parallel for either the single or multiple phase embodiments.

The following is a listing of the particular devices and their manufacturers which can be used to implement the elements of the circuits illustrated in FIGS. 3 and 4.

| Element | Part No. | Manufacturer |
| --- | --- | --- |
| Diode 30 | GP15M-023 | General Instrument, Corp. |
| Diode 44 | GP15M-023 | General Instrument, Corp. |
| Diode 46 | GP15M-023 | General Instrument, Corp. |
| Piezoelectric Horn 48 | 583931 | Outboard Marine Corp. |
| Filter Capacitor 49 | 513D107-M025BB4 | Sprague Electric Co. |
| Variable Ratio Oiler 50 | 174876 | Outboard Marine Corp. |
| Thermo-Switch 52 | | |
| Low Oil Switch 54 | 174164 | Outboard Marine Corp. |
| Diode 70 | GP15M-023 | General Instrument, Corp. |
| Diode 72 | GP15M-023 | General Instrument, Corp. |
| Diode 74 | GP15M-023 | General Instrument, Corp. |

While the preferred embodiments of the invention have been illustrated and described, it will be obvious to those skilled in the art that various modifications and changes may be made thereto without departing from the spirit and scope of the invention as hereinafter defined in the appended claims.

For example, it is evident that many different types of alternators may be used for powering the annunciation means. Both single and multiple phase alternators can be used because the teachings of the invention illustrate such are equivalent. Further, a DC generator could be another substitute with suitable blocking diodes which did not allow battery power to reach the annunciator when the engine was not operating.

Additionally, a parallel connection for the sensor circuits 26 is illustrated but is not necessary for practice of the invention. Different connections of the sensors in series, parallel, or combinations of series-parallel can advantageously be used.

Various features of the invention are set forth in the following claims.

What is claimed is:

1. A warning system for an internal combustion engine without a switched B+ power line and having an alternator connected to and charging a battery, said system comprising:
   power supply means connected between said alternator and an auxiliary power supply node, said power supply means adapted to supply power to said power supply node only when said alternator is rotating;
   annunciator means for alerting an operator of an abnormal condition of the engine, said annunciator means connected between said power supply node and a common node; and
   sensing means, connected between said common node and a reference voltage, for connecting said common node to said reference voltage when an abnormal condition of the engine is sensed thereby enabling said annunciator means.

2. A warning system for an internal combustion engine as set forth in claim 1 which further includes:
   means for filtering power from said alternator at said auxiliary power supply node.

3. A warning system for an internal combustion engine as set forth in claim 1 wherein said annunciator means includes:
   a piezoelectric horn.

4. A warning system for an internal combustion engine as set forth in claim 1 wherein said reference voltage is ground and said sensing means includes:
   low oil sensing means connected between said common node and ground which connects said common node to ground if a low oil condition is present.

5. A warning system for an internal combustion engine as set forth in claim 4 wherein said sensing means further includes:
   a variable ratio oiler connected between said common node and ground which connects said common node to ground if an abnormal fuel mixture condition is present.

6. A warning system for an internal combustion engine as set forth in claim 5 wherein said sensing means further includes:
   thermal sensing means connected between said common node and ground which connects said common node to ground if an engine over temperature condition is present.

7. A warning system for an internal combustion engine as set forth in claim 1 wherein said alternator includes a single phase stator winding and a full-wave rectifier bridge and said power supply means includes:
   a first diode connected between one terminal of said stator winding and said power supply node; and
   a second diode connected between the other terminal of said stator winding and said power supply node.

8. A warning system for an internal combustion engine as set forth in claim 7 wherein:
   said first and second diodes are poled in the direction of one side of said full-wave bridge.

9. A warning apparatus for an internal combustion engine as set forth in claim 1 wherein said alternator includes a plurality of stator windings having separate phases and a full-wave rectifier for each phase and said power supply means includes:
   a first diode connected between one terminal of a first stator winding and said power supply node;
   a second diode connected between the common terminal of said first stator winding and a second stator winding and said power supply node; and
   a third diode connected between the other terminal of said second stator winding and said power supply node.

10. A warning system for an internal combustion engine as set forth in claim 9 wherein:
    said first, second, and third, diodes are poled in the direction of one side of each phase of said full-wave bridge.

11. A warning system for an internal combustion engine without a switched B+ power line and having an alternator connected to and charging a battery, a starter solenoid for connecting the battery to a starter motor, and a starter switch for operating the starter solenoid, said system comprising:
    power supply means connected between said alternator and an auxiliary power supply node, said power supply means adapted to supply power to said power supply node only when said alternator is rotating;
    annunciator means for alerting an operator of an abnormal condition of the engine, said annunciator means connected between said power supply node and a common node;
    sensing means, connected between said common node and a reference voltage, for connecting said common node to said reference voltage when an abnormal condition of the engine is sensed thereby enabling said annunciator means; and means for connecting the positive terminal of the coil of the starter solenoid to said power supply node so that battery power is applied to said supply node during starting.

12. A warning system for an internal combustion engine as set forth in claim 11 which further includes:
means for filtering power from said alternator at said auxiliary power supply node.

13. A warning system for an internal combustion engine as set forth in claim 11 wherein said annunciator means includes:
a piezoelectric horn.

14. A warning system for an internal combustion engine as set forth in claim 11 wherein said reference voltage is ground and said sensing means includes:
low oil sensing means connected between said common node and ground which connects said common node to ground if a low oil condition is present.

15. A warning system for an internal combustion engine as set forth in claim 14 wherein said sensing means further includes:
a variable ratio oiler connected between said common node and ground which connects said common node to ground if an abnormal fuel mixture condition is present.

16. A warning system for an internal combustion engine as set forth in claim 15 wherein said sensing means further includes:
thermal sensing means connected between said common node and ground which connects said common node to ground if an engine over temperature condition is present.

17. A warning system for an internal combustion engine as set forth in claim 11 wherein said alternator includes a single phase stator winding and a full-wave rectifier bridge and said power supply means includes:
a first diode connected between one terminal of said stator winding and said power supply node; and
a second diode connected between the other terminal of said stator winding and said power supply node.

18. A warning system for an internal combustion engine as set forth in claim 17 wherein:
said first and second diodes are poled in the direction of one side of said full-wave bridge.

19. A warning apparatus for an internal combustion engine as set forth in claim 11 wherein said alternator includes a plurality of stator windings having separate phases and a full-wave rectifier for each phase and said power supply means includes:
a first diode connected between one terminal of a first stator winding and said power supply node;
a second diode connected between the common terminal of said first stator winding and a second stator winding and said power supply node; and
a third diode connected between the other terminal of said second stator winding and said power supply node.

20. A warning system for an internal combustion engine as set forth in claim 19 wherein:
said first, second, and third diodes are poled in the direction of one side of each phase of said full-wave rectifier.

* * * * *